A. GRAVEL.
TIMBER FELLING WEDGE.
APPLICATION FILED JAN. 25, 1916.
1,198,436.
Patented Sept. 19, 1916.
2 SHEETS—SHEET 1.
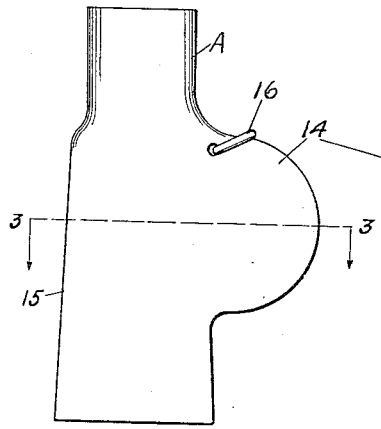
Fig. 1.
Fig. 2.
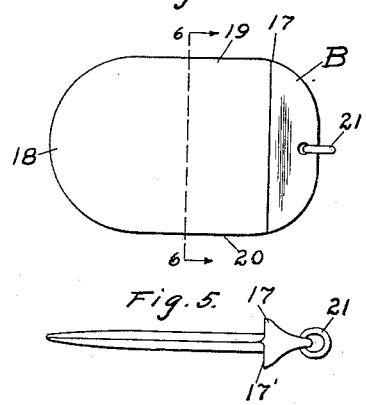
Fig. 4.
Fig. 5.
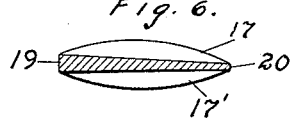
Fig. 6.
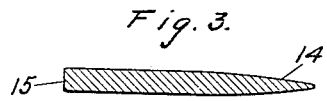
Fig. 3.
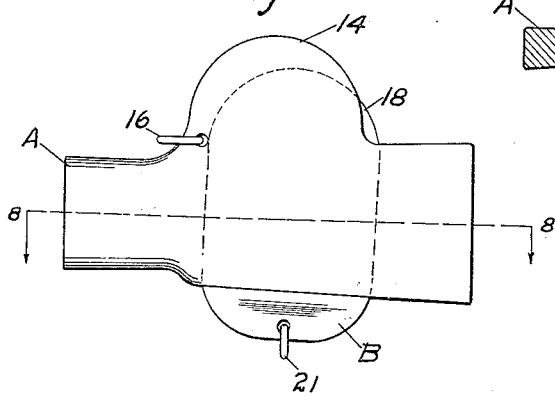
Fig. 7.
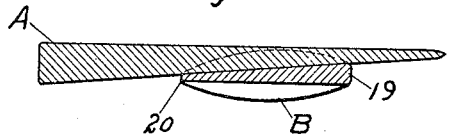
Fig. 8.
Witnesses:
J. C. Strong.
E. W. Lindhe.
Amable Gravel, Inventor,
By R. C. Wright
Att'y.

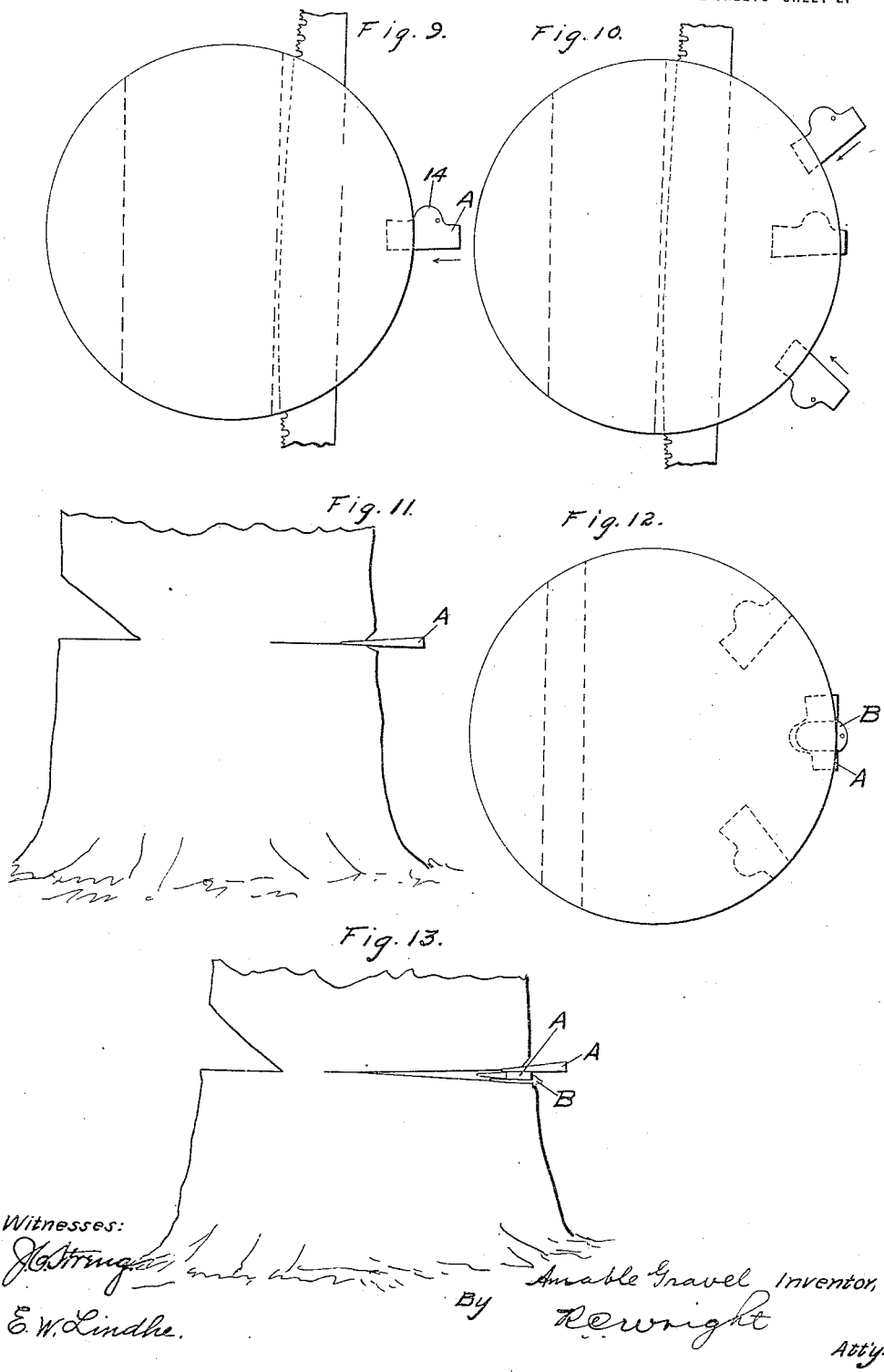

UNITED STATES PATENT OFFICE.

AMABLE GRAVEL, OF PORTLAND, OREGON.

TIMBER-FELLING WEDGE.

1,198,436. Specification of Letters Patent. Patented Sept. 19, 1916.

Application filed January 25, 1916. Serial No. 74,164.

*To all whom it may concern:*

Be it known that I, AMABLE GRAVEL, a citizen of the Dominion of Canada, residing at Portland, in the county of Multnomah and State of Oregon, have invented a new and useful Improvement in Timber-Felling Wedges, of which the following is a specification, reference being had to the accompanying drawings.

My invention relates to that class of devices used by woodsmen in felling trees and particularly large, heavy trees.

The object of my invention is to provide a device of the character mentioned, in which there is a combination of the wedge and a leveling plate. I attain these objects as well as other advantages, by the construction, combination and arrangement of parts illustrated in the accompanying drawings which form a part hereof.

Figure 1 is a plan view of the wedge Fig. 2 is a right side view of same. Fig. 3 is a sectional view on line 3—3 of Fig. 1. Fig. 4 is a plan view of a leveling plate. Fig. 5 is a side view of same. Fig. 6 is a sectional view of same on line 6—6 of Fig. 4. Fig. 7 is a plan view of wedge and leveling plate in operative position. Fig. 8 is a sectional view on line 8—8 of Fig. 7. Fig. 9 is a plan view of a tree trunk with wedge inserted in saw cut. Fig. 10 is a similar view showing saw and three wedges in position. Fig. 11 is a side elevation of same view shown in Fig. 9. Fig. 12 is a plan view of a tree trunk showing wedge and leveling plate in operative position at center and a wedge in each corner therefrom. Fig. 13 is an elevation of a tree trunk showing wedge and leveling plate in operative position and a second wedge above same.

Like letters and numerals refer to like parts throughout the views.

A is the wedge.

B is the leveling plate.

The wedge A is provided with an integral, auxiliary, transverse wedge 14 which extends along and outwardly from the former suitable distances. The wedge 14 on its inner end tapers downward to conform on this line to the shape of the wedge A. From this line and transversely to it the wedge 14 tapers outwardly on both surfaces. This wedge is provided with a securing ring 16. The leveling plate B has shoulders 17—17′. This plate tapers on both surfaces from the shoulders outwardly to its end. It also tapers on both surfaces from the side 19 to the side 20.

It will now be seen that in using my device, the wedge A is driven partly into the cut at the center after the saw has progressed to a desired position as shown in Fig. 9. This wedge is later finally driven in its full length as shown in Fig. 10. Similar wedges are then driven in at each side of it or the corners, according to the woodsmen's terms. These are driven a suitable distance for the purposes of preventing the weight of the super trunk from binding the saw and also to guide the tree toward its desired felling direction. Fig. 11 shows the wedge in the same position as in Fig. 9. When the corner wedges as in Fig. 10 are driven in their full length as illustrated in Fig. 12, the center wedge is removed and its lateral wedge 14 inserted in the same place, the leveling plate B is then inserted or driven in below it and the combination of the two makes a horizontal plane above and below, thus tending to retain the super trunk in a desired position. A second wedge may then be driven in above these as shown in Fig. 13, and one or both corner wedges removed and a similar procedure followed in each place. The like may be done in any part of the cut with as many wedges and plates as are found to be necessary or adequate. It has heretofore been extremely difficult to fell trees in a desired direction and to prevent the saw from binding in the cut with appliances now in use. For instance, ordinary wedges and flat plates are commonly used. It has been found that these in combination only preserve a wedge formation and often spring out at a critical time, thus hampering or preventing a successful operation. The tree may then fall too soon or in the wrong direction and be split or damaged, which causes a loss of much valuable material. I contend that I have overcome all these difficulties in providing the useful device which I herein describe. It is simple, convenient, durable and economical and can be employed quickly in every conceivable manner and position.

Having thus fully described my device I claim—

1. A device of the character described comprising a wedge A of common type having an auxiliary, transverse wedge 14 which conforms to and extends along and outwardly from the side of the former suitable distances, said wedge 14 tapering on both its surfaces outwardly from the wedge A, substantially as described.

2. A device of the character described comprising a wedge A of common type, having an auxiliary, transverse wedge 14 which conforms to and extends along and outwardly from the former suitable distances, said wedge 14 tapering on both its surfaces outwardly from the wedge A, and a leveling plate provided with shoulders at one end on each surface, said plate tapering from the shoulders outwardly and from one side to the other on each surface, substantially as described.

3. A timber-felling device comprising a wedge A formed in the common type with a lateral wedge extending therefrom, and a supporting wedge or plate, said wedge A and supporting wedge having provision in and upon each to engage each other in a manner that when so engaged parallel horizontal planes are formed on the upper and lower surfaces on the combined members, substantially as described.

AMABLE GRAVEL.

Witnesses:
J. B. HAVILAND,
H. O. HOWARD.

Copies of this patent may be obtained for five cents each, by addressing the "Commissioner of Patents, Washington, D. C."